May 8, 1928.
G. G. MACKEY
TEST INDICATOR
Filed July 16. 1926
1,668,857
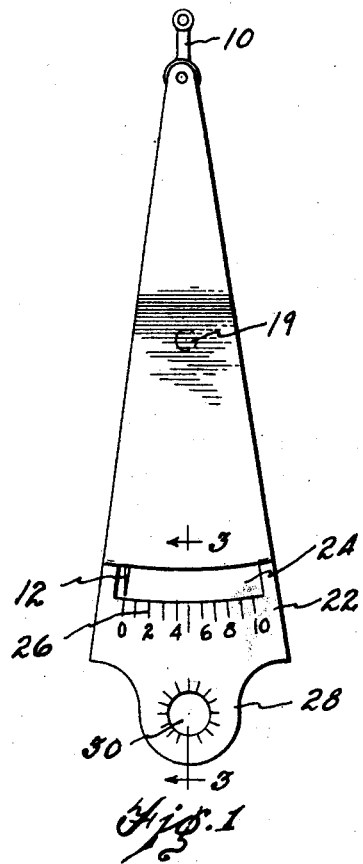
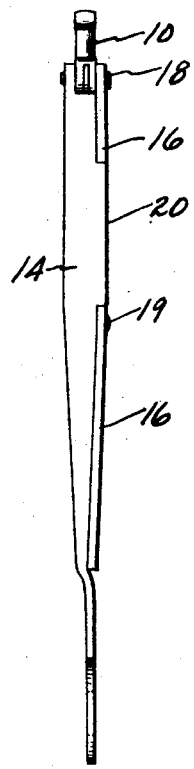
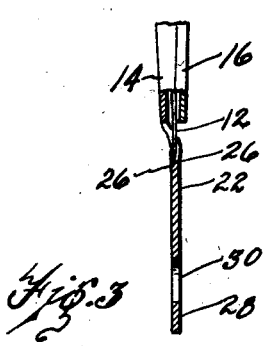
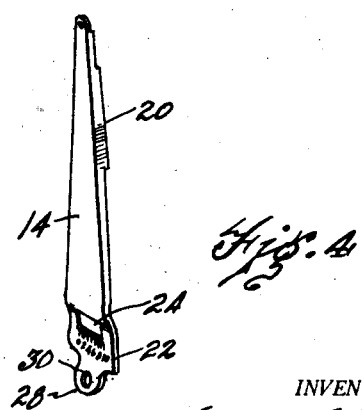
INVENTOR.
GAYLORD G. MACKEY
BY
Parker & Burton
ATTORNEY.

Patented May 8, 1928.

1,668,857

UNITED STATES PATENT OFFICE.

GAYLORD G. MACKEY, OF DETROIT, MICHIGAN, ASSIGNOR OF ONE-HALF TO ALBERT LOOSLI, OF DETROIT, MICHIGAN.

TEST INDICATOR.

Application filed July 16, 1926. Serial No. 122,807.

My invention relates to an improved test indicator and particularly to an improved housing therefor.

The object is to provide a test indicator of simple construction so built and arranged that it may be read from either side and at any position. A further object is to provide such an indicator having a single indicating hand so housed as to be protected by a suitable guard, which guard is graduated on both sides and forms a double faced reading scale for the indicating hand.

An additional meritorious feature lies in the provision of a support at one end of the indicator whereby it may be fastened in position, which support forms a part of the guard that surrounds the projecting end of the indicating hand.

Other objects, advantages and features of merit will more fully appear from the following specification, accompanying drawing and appended claims.

In the drawing:

Fig. 1 is a side elevation of my improved indicator.

Fig. 2 is an elevation taken at right angles to the view in Fig. 1.

Fig. 3 is a vertical sectional view taken on the line 3—3 of Fig. 1.

Fig. 4 is a perspective of one side plate of the housing.

My invention relates particularly to the housing provided for a test indicator of any conventional type and therefore I have not illustrated the particular operating mechanism which is disposed within the housing. Test indicators of this general class are built in different forms but each comprises a surface contact member which is identified in the drawing as 10 and an indicating hand identified as 12. Suitable amplifying mechanism couples the contact member 10 with the indicating hand 12 whereby, when the contact member is swung to either side, it actuates the hand and the extent of travel of the hand is measured on a provided reading scale.

I provide a housing so formed that the travel of the hand may be read from either side and at any convenient position and the housing has a part which serves as a guard to protect the hand and such guard has an end projection which serves as a support whereby the indicator may be fastened in position for use.

I prefer to form my housing out of two side plates which in the drawings are indicated as 14 and 16. 18 indicates a suitable connecting screw which may serve as a pivot for the member 10 and also serve as a fastener to secure the two side plates together at the small end and 19 indicates a second screw used also to secure the side plates together. The side plate 10 is formed as shown in Figs. 2 and 4, with flanges 20 which embrace the plate 16 and with sides extending in the same plane as the flanges 20 so that such plate is actually recessed on the side adjacent the plate 16, thereby forming a hollow casing within which is disposed the amplifying connection between the contact member 10 and the indicating hand 12.

The plate 14 projects at the large end beyond the plate 16 forming a graduated sector 22 provided with an opening 24. This extension is offset laterally as shown in Figs. 2, 3, and 4, so that the indicating hand 12 is disposed entirely within the plane of the sector 22 projecting into the opening 24 to travel therethrough as the hand is swung in one direction or the other. This sector is graduated as indicated at 26 on both sides adjacent the outer margin of the opening 24. These graduations register with each other so that the position of the hand may be read from either side.

The graduated sector 22 has a projecting ear 28 which is apertured as at 30 to receive a tightening bolt or other suitable support in order that the indicator may be suitably supported for use.

What I claim is:

1. In a test indicator having a surface contact member projecting beyond one end thereof and an indicating hand actuated thereby projecting beyond the opposite end, a housing comprising a pair of complementary side plates fastened together, one of said plates projecting beyond the other in the form of an extension cut away to provide an opening for the indicating hand to travel through, said extension being laterally offset to lie within the plane of the indicating hand to serve as a guard therefor, said extension being graduated on both sides along the outer margin of the opening therethrough and provided with an outwardly projecting apertured ear adapted to serve as a support for the instrument.

2. In a test indicator having a surface contact member projecting beyond one end and an indicating hand projecting beyond the opposite end, a housing having one side plate extending outwardly beyond the indicating hand and cut away to provide an opening therefor, said plate being offset to lie within the plane of the hand to serve as a guard therefor and graduated on both sides along the outer margin of said opening.

3. A test indicator having a surface contact member at one end and an indicating hand at the opposite end and provided with a housing having a plate extending outwardly beyond said hand and cut away to form an opening for the hand to travel through and graduated on both sides along the outer margin of said opening, said hand being positioned within said opening and wholly within the plane of the plate.

4. In a test indicator, a housing having a side plate recessed to receive an indicating hand, said hand projecting beyond said recessed portion at one end and said plate having an offset extension at such end and being cut away at the point of offset to provide an opening through which the hand travels within the plane established by such extension, said plate provided with complementary reading scales arranged on opposite sides thereof near a margin of such opening.

5. In a test indicator, a housing comprising a pair of side plates provided with an extension at one end cut away adjacent to the end of the housing and having complementary reading scales arranged on opposite sides adjacent to a margin of such cut away opening, an indicator hand mounted between said plates and extending into the opening of the extension within the plane thereof and a surface contact member cooperating therewith and extending beyond the opposite end of the housing.

6. In a test indicator, a housing having spaced side walls and provided with an extension offset one side wall and projecting beyond the end of the housing, said extension having an opening adjacent to the end of the housing provided with complementary reading scales arranged on opposite sides adjacent to the outer margin of said opening, said extension having a part adapted to serve as a support for the instrument, and an indicator needle pivoted within said housing and terminating at one end in a pointer extending into the opening of said extension and within the plane of said extension and a surface contact member cooperating with said indicator needle and extending beyond said housing at the end opposite said extension.

In testimony whereof, I sign this specification.

GAYLORD G. MACKEY.